United States Patent
Harper

(10) Patent No.: US 7,665,417 B1
(45) Date of Patent: Feb. 23, 2010

(54) ADAPTIVE ANIMAL FEEDER

(76) Inventor: Judith A. Harper, 2256 Portola Way, Sacramento, CA (US) 95818

(*) Notice: Subject to any disclaimer, the term of this patent is extended or adjusted under 35 U.S.C. 154(b) by 328 days.

(21) Appl. No.: 11/454,650

(22) Filed: Jun. 19, 2006

(51) Int. Cl.
*A01K 5/00* (2006.01)
(52) U.S. Cl. .................................... 119/51.01; 119/61.5
(58) Field of Classification Search ................ 119/408, 119/51.01, 51.12, 900, 61.5–61.57; D30/133, D30/121, 129, 131; 47/39
See application file for complete search history.

(56) References Cited

U.S. PATENT DOCUMENTS

| | | | | | |
|---|---|---|---|---|---|
| 2,138,560 | A | * | 11/1938 | Stuart | 220/23.83 |
| 2,290,572 | A | * | 7/1942 | Rakov | 126/339 |
| 2,659,345 | A | * | 11/1953 | Herbert | 119/28.5 |
| 2,845,896 | A | * | 8/1958 | Copeland | 119/51.01 |
| 4,022,160 | A | * | 5/1977 | Lester | 119/51.01 |
| 5,152,247 | A | * | 10/1992 | Brown | 119/464 |
| D374,517 | S | * | 10/1996 | Morrill | D30/133 |
| 5,709,168 | A | * | 1/1998 | Walker | 119/61.5 |
| 5,782,374 | A | * | 7/1998 | Walker | 220/23.87 |
| 5,794,565 | A | * | 8/1998 | Beshah | 119/61.54 |
| 6,193,097 | B1 | * | 2/2001 | Martin Perianes | 220/592.03 |
| 2005/0217591 | A1 | * | 10/2005 | Turner et al. | 119/51.02 |

* cited by examiner

*Primary Examiner*—Rob Swiatek
(74) *Attorney, Agent, or Firm*—Marc C. Jacobs

(57) ABSTRACT

A drawer-mounted feed bowl shelf to hold an animal's food or water bowl, adapted for mounting on the edges of the sidewalls of a cabinet drawer, or for mounting between the sidewalls of a drawer is disclosed. The first embodiment includes an expandable mount to permit mounting on or in drawers of various widths. The expandable mount include two sections one above the other, the upper one moving laterally relative to the lower section. The second fixed-width embodiment can be either mounted permanently or removably on or fixedly in a cabinet drawer. A gasket that fits over and within the opening for the bowl adds friction to prevent bowl movement when present. This invention permits the feed bowl to be out of sight when not in use.

9 Claims, 6 Drawing Sheets

ADAPTIVE ANIMAL FEEDER

FIELD OF THE INVENTION

This application relates to a permanent or removable adjustable shelf mounted feed bowl that mounts on a kitchen or other cabinet drawer, either permanently or removably, for the feeding of or watering of a dog or cat.

BACKGROUND OF THE INVENTION

Millions of people in the USA and other countries enjoy the company of a dog or cat in their home. Ofttimes however, in these days of record increases in real estate property values in many locations, people find that the size of the home that they can afford limits the size of the kitchen or laundry room area where pets are often fed. The pets are fed in these rooms because pets tend to not be good housekeepers, in that they spill pet food over the feeding zone, the results of which can be detrimental to rugs and wood floors.

Those pet owners who do have space for dog bowls or cat bowls on the floor often don't want the feed/water bowls there because floor traffic can cause spillage of the bowl contents.

Pet owners with young children will always fret that the toddler will eat Rover's dog food, which may be the wrong diet for the toddler.

The applicant of this application has concluded that the invention of this application solves the concerns of all of the above-recited pet owners. The bowl is out of sight, when not in use, is available when needed, and does not interfere with foot traffic other than the brief time that the animal has access to the bowl.

SUMMARY OF THE INVENTION

A fixed width or adjustable width feed bowl drawer for dogs, cats, and other animals, that mounts on top of or between the side walls of a drawer of a kitchen, bath or other cabinet. Various readily available materials can be used for the shelf. The shelf has a central aperture for the receipt of a lipped bowl to be suspended downwardly thereon. A gasket may be interposed between the bowl and the aperture to prevent any liquid in the bowl from entering the interior confines of the drawer, should spillage occur.

DESCRIPTION OF THE PREFERRED EMBODIMENT

Figures 1, 2:
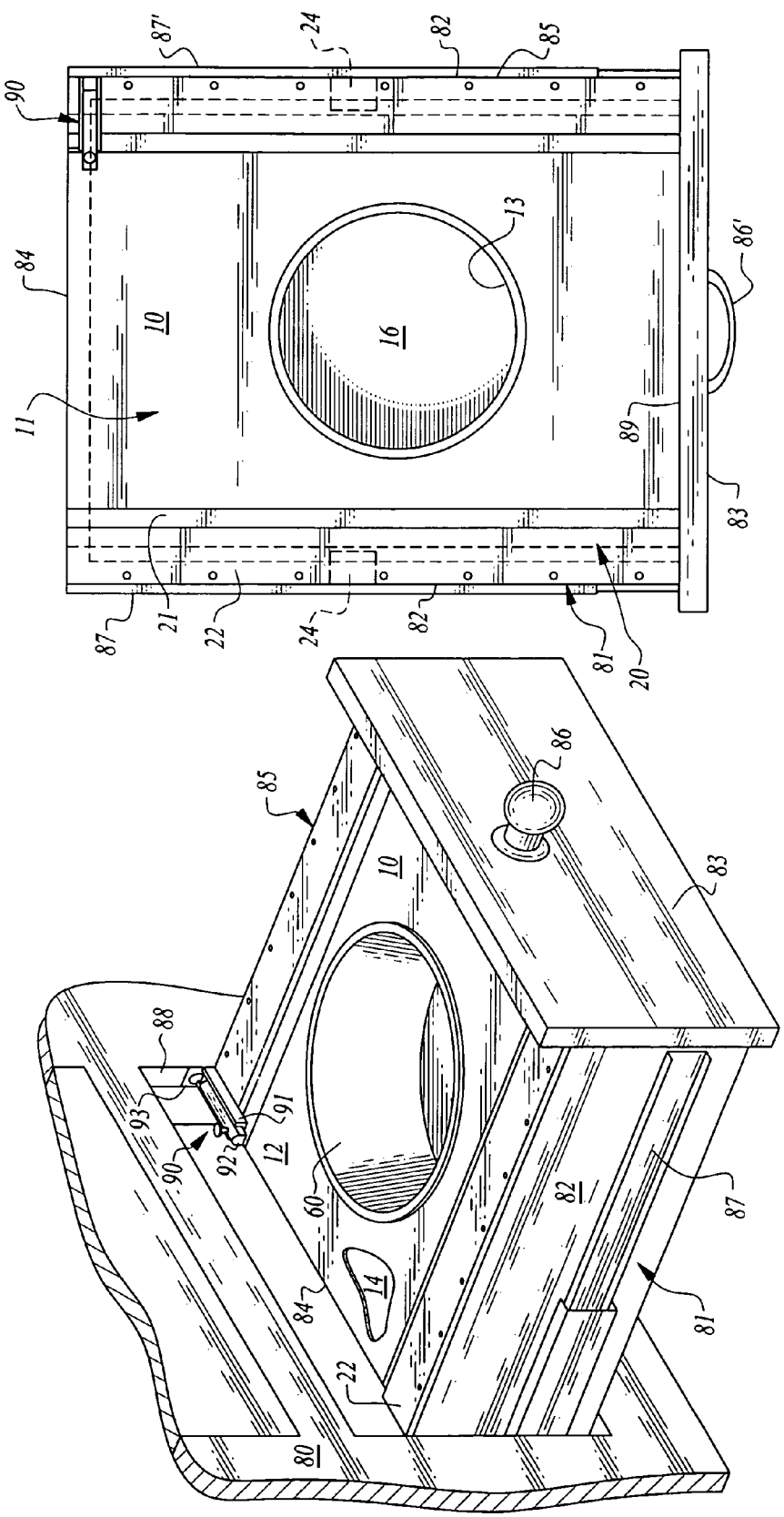
FIG. 1 is a left perspective view of the first embodiment of this invention in an installed position.
FIG. 2 is a top perspective view of the first embodiment installed.

The feed bowl shelf of this invention 10, is shown in FIG. 1 mounted onto a typical kitchen cabinet base drawer 81 located in a kitchen cabinet 80. In this cabinet 80, there is a framework for the drawer designated 88. The drawer 81 extends outwardly from the cabinet 80 by a matched and opposed pair of drawer slides 87 and 87'. This drawer 81 per se, is similar to most drawers in that it has a front exterior wall 83, and perhaps a hidden interior front wall 89; not seen here but seen in FIG. 2, a pair of spaced side walls, the left one 82 and the right one designated 85. The front wall has a somewhat higher elevation than the other three walls, which is common in drawer construction. A drawer pull or handle 86 is conventionally attached to the drawer front 83.

The shelf 10 has a base 11, seen in the cutaway of FIG. 1. The base (or substrate) is a quadrilateral having four right angles, which means it is square or rectangular in shape and having parallel front and rear edges and spaced side edges. The base may be made of wood, medium density fiberboard—MDF—, striated fiberboard, or any other suitable surface to which a water-resistant overlay 12 is attached. Overlay 12 can be a coating of paint, such as enamel to present an easily washable surface, high or low pressure laminate of any pattern desired. In the alternative the entire shelf can be constructed of water shedding material such as Corian®, Silestone®, or other suitable solid surface material.

The mounting means 20 is formed primarily of two parts 21 and 22 as will be discussed infra. In FIG. 1, only the upper mount section—UMS—is seen, with the lower mount section—LMS—not being visible in this view. The locking mechanism seen in FIG. 1 will be discussed with respect to FIG. 15.

In FIG. 2, a top perspective view, the lower mount section LMS 21 is seen adjacent the UMS 22, for this particular installation of the shelf. The UMS 22 has a topside and an underside designated "T" and "U" respectively as does the LMS—see FIG. 5—and said UMS is shown spaced slightly above the drawer; while the LMS 21 is either flush or below the upper edge of the respective side wall. The UMS may be pre-drilled for nailing or the reception of screws, for attachment to or in a drawer prior to extension if desired.

A series of optional spring clips 24, may be employed instead of nails or screws, and such spring clips are disposed on the underside of the UMS, and secure the shelf 10 to the drawer sides 82 and 85. Clips 24 may also be used to engage shelf 10 to the rear wall of the drawer. Front clips are not feasible for various reasons. If the drawer uses single or uses a double wall construction front for the drawer, does not permit the clip cannot o to engage the wall. And, if the front wall is either single or double walled, with the exterior wall higher as shown here, engagement cannot be had. Note the presence of optimal interior front wall 89 whose elevation equal that of the side walls.

Also seen in this figure is aperture 13 which receives the bowl 60 shown in FIG. 1. Note also that a handle 86' is shown rather than knob 86 on the front wall.

Figure 3:
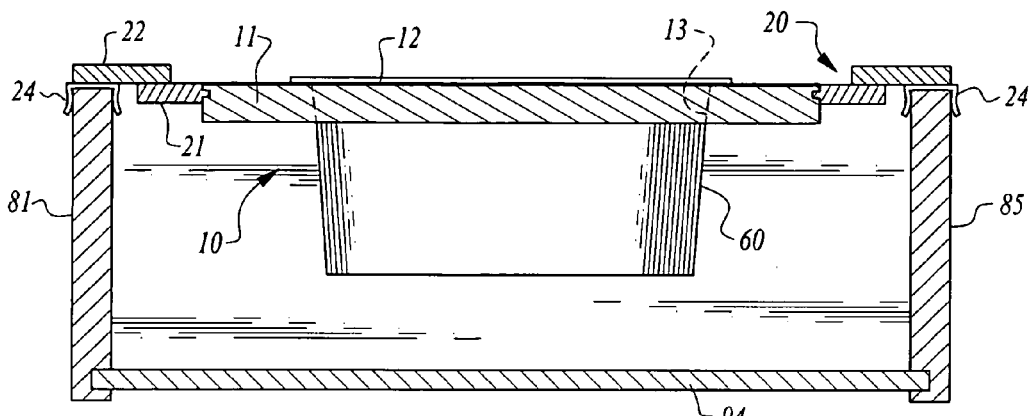
FIG. 3 is a front sectional view of the installed first embodiment of the feed bowl shelf.

FIG. 3 shows a sectional view of a typical drawer with the first embodiment of the shelf 10 of this invention installed thereon. Typical drawer construction is seen in the spaced sidewalls 81,85 being attached to the drawer bottom wall 94. The one drawer slide shown in FIG. 1 has been omitted for ease and convenience of the reader since the slides form no part of the invention.

Substrate 14 with its overlay 12 is seen connected to the left mount means 20, which is comprised of an LMS 21 from which extends the respective UMS 22. One of the clips 24 is seen in actual engagement with the left drawer wall 81. The bowl opening 13 and the bowl 60 is shown in phantom line.

Figure 4:
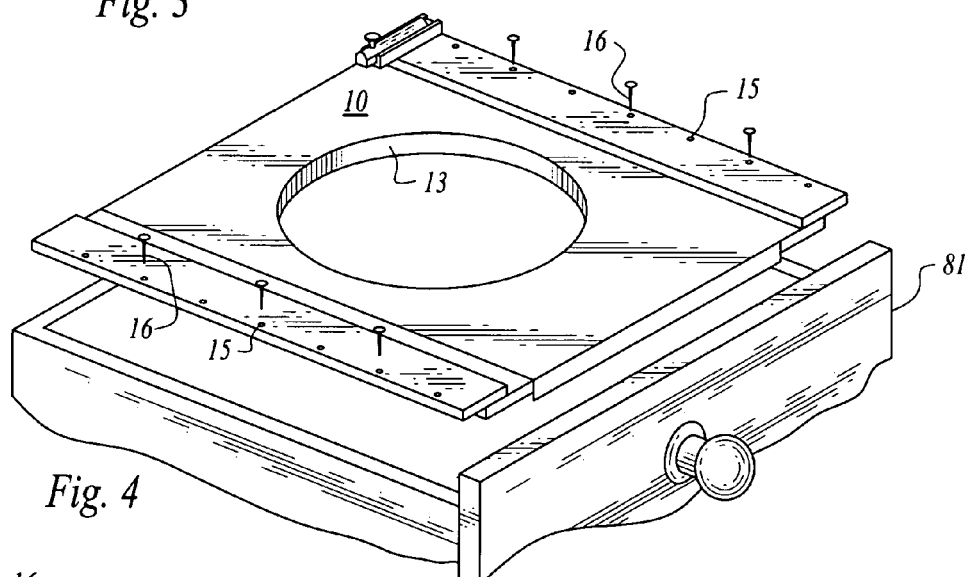
FIG. 4 is a close-up top perspective view of the first embodiment, prior to installation.

FIG. 4 is a top perspective view of an expanded feed bowl shelf 10 in the process of being mounted by nails/screws 16 into pre-drilled holes 15.

Figure 5:
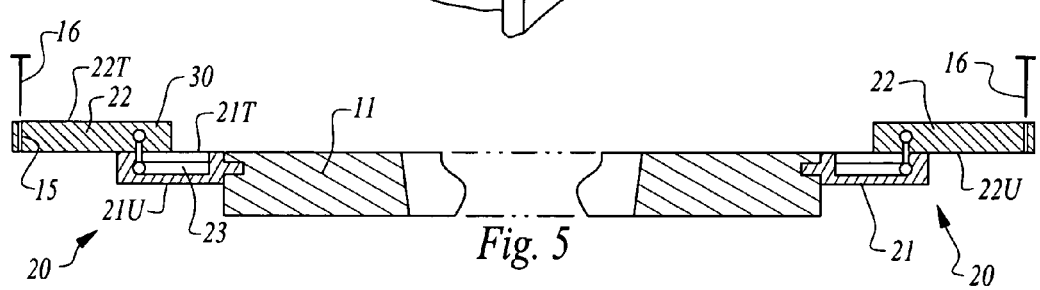
FIG. 5 is a diagrammatic elevational view of a first mode of installation and mounting of the adjustable width feed bowl shelf of this invention.
Figure 6:
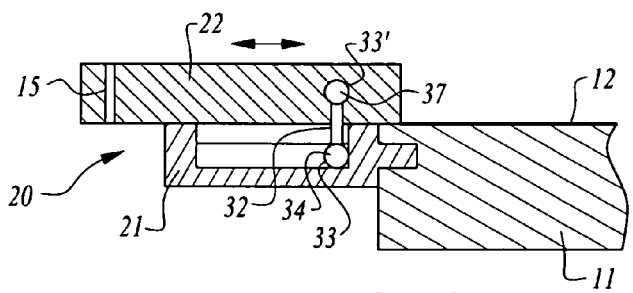
FIG. 6 is a close-up diagrammatic elevational view of the first mounting means on the left side of the half of this invention's first embodiment.
Figure 7:
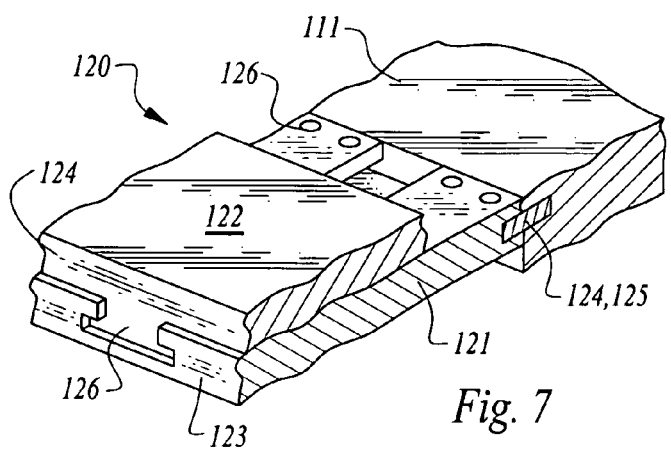
FIG. 7 is a perspective view to illustrate a second mount means for the first embodiment of the feed bowl shelf of this invention.

FIGS. 5 and 6 show one mode of engagement of the UMS to the LMS, while FIG. 7 illustrates similar details of a second engagement means for the adjustable width first embodiment. In FIG. 5, the shelf 10 is seen in cutaway to emphasize that the important aspects of the figure pertain to the connection mode. Thus it is seen that each LMS 21 has an elongated internal slot 23 through which slides a pin 34, which pin is connected at opposite ends to a bar/rod 32 as per FIG. 6. The bar or rod 32 has a bore 33 at the lower end to receive lower pin 34 therethrough, and an upper bore 33' to receive upper pin 37. Note that each pin 37—the second pin not being visible in these views—is fixedly attached to UMS 22. While pin 34 can slide back and forth in slot 23, until the correct extension relative to the LMS is achieved, it only moves in reality one time to achieve the desired extension since once the desired elongation is achieved, the upper mount section is either clipped or nailed or screwed to the side walls of the cabinet drawer. Both mount means 20, the left and right operate in like manner.

FIG. 7 illustrates a second mode of mounting for the adjustable width first embodiment. Here the mount means 20 and the respective elements 21 and 22 have been renumbered as 120, 121 and 122 respectively because of their slightly different configurations from the original. LMS 121 may be fixedly attached to the side edge of base 11 in any of a multitude of conventional ways. A full-length tongue 124, on the underside of upper mount section 122 engages a groove 125 of the upper face of the LMS 121. Thus the UMS can move laterally relative to the fixedly mounted LMS by moving the tongue in the groove. Optional nails or screws 126 can be used for an extra secure engagement of the LMS to base 11. This means of attaching the base 11 to the LMS can be for connecting the base 11 to first mode of attachment, 20 as well. While the tongue is shown on the upper mount section in FIG. 7, the tongue and groove may be reversed with the tongue on the lower mount section and the same lateral motion achieved.

The mount means 120 of this second mode of attachment employs an LMS 121 having a generally rectangular body section with an inverted Tee-shaped groove 125. The UMS 122 has a generally rectangular main body, with a downwardly depending inverted Tee-foot, sized slightly smaller than the groove of the LMS, such that engagement can be made of the inverted Tee-shaped foot, to the inverted Tee groove. Rather than being coextensive, the foot projects toward the viewer up to about 1 inch less than the elongation of the main body 124. This permits the foot to slide within the groove, but the excess length of the main body, permits the main body to rest upon the thickness of the sidewall of the drawer, which can vary from ½-inch to about 1 inch. The foot therefore rests adjacent the interior face of the sidewall of the drawer. FIG. 7 has the extended part or overhang of the main body 124 cutaway to permit a viewing of the inverted Tee-shaped foot. In contrast, the UMS of the first mode of attachment for the first embodiment lacks the abutment on the interior face of the sidewall of the drawer.

Figure 9:
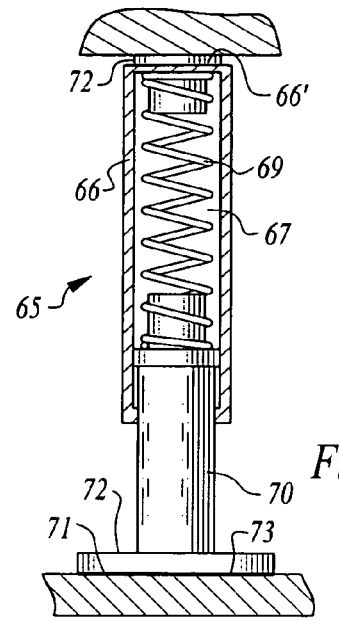
FIG. 9 is a close-up view of one of the supports shown n place in FIG. 8.
Figure 8:
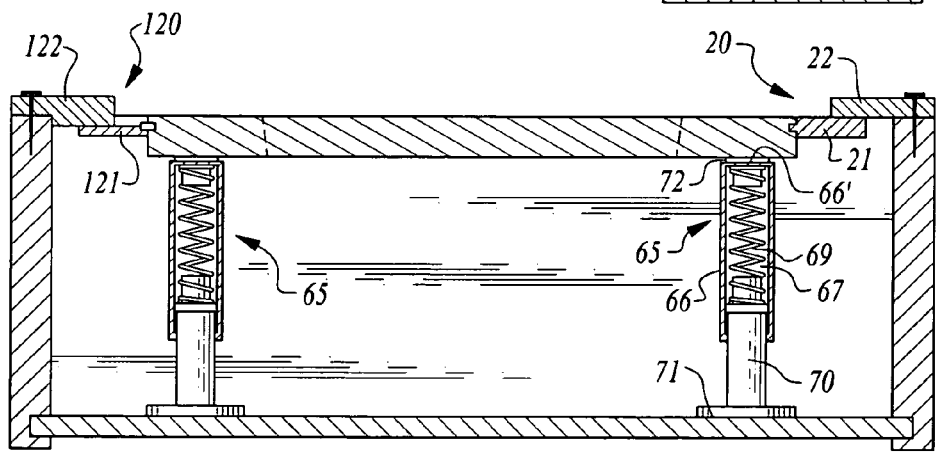
FIG. 8 is a sectional view showing the first embodiment of this device of this invention in its to be mounted position with a pair of optional additional supports in position beneath the shelf.

FIG. 8 pertains to the utilization of optional supplementary supports for the feed bowl shelf, especially if the food shelf is to be used for a big dog such as an Akita, or Mastiff or Great Dane for whom the bowl would be bigger and thus carry more weight. These supplementary supports prevent the shelf 11 or 121 from sagging. FIG. 9 is a close-up view of one of these supplementary supports.

FIG. 8, is a sectional view that features the left side being mounted by the second mount means 120 and the right side being mounted by the first mount means 20 for shelf 10. Shown disposed beneath the shelf 10 is a pair of optional supplementary supports, only at least one of which need be provided to prevent sagging of the shelf 10. Supplementary supports 65 are used to prevent sag should a bulldog place its paws on the shelf. In FIG. 9, one of these is shown separately and enlarged, while in FIG. 8, two of these spring loaded supplementary supports are shown installed.

Supplementary support 65 includes a rubber or plastic pad 72, which is seen also in FIG. 8 that extends upwardly from the top wall 66' of an outer housing 66. This outer housing 66 is an elongated tube closed off at the top by top wall 66', and open at the bottom. Within the channel or chamber 67 is disposed a coil spring 69 which is connected at one of its ends to the top wall 66' on the interior surface thereof. The other end of the spring is connected to rod 70 which is sized to dwell partly within the channel 67 both when the spring 69 is compressed and at rest. The balance of rod 70 extends outwardly from the channel when the spring is relaxed, but remains in the channel as well. See FIG. 9. At the end of the rod not connected to spring 69 is a tip of rubber or some other gripping material, 71. Thus when the spring is compressed by the shelf being placed in position for mounting, the supplementary supports(s) 65 provide extra sturdiness to the shelf so it won't sag under the weight of a dog or from the food placed in the feed bowl. Tip 71 is in contact with the interior surface of the drawer bottom and the pad 72 is in contact with shelf 10's underside. To make the placement task easier, an adhesive layer 73 may be placed on the tip surface in contact with shelf 10, prior to placing the device into position. Otherwise it will be necessary to reach under the un-extended mount means to position the supplementary support(s) into position.

Figure 10:
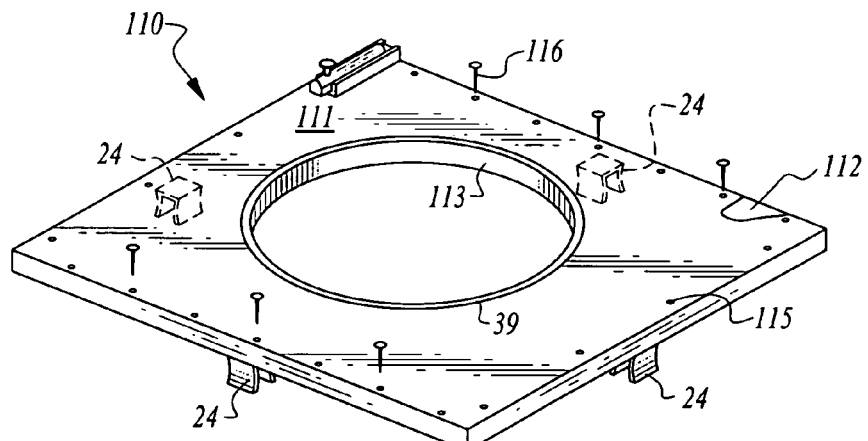
FIG. 10 is a top perspective view of the second embodiment of this invention, the non-adjustable embodiment.

FIG. 10 is a top perspective view of the second embodiment of this invention. Here shelf 111 has an opening 113, usually in the center for bowl placement. Shelf 110 is a non-expandable version that includes a series of through-bores 115 through which screws or nails, 116, secure the shelf 110 to the drawer 81. These throughbores are preferably placed on the two sides and the rear edges of the shelf 110 and not at the front edge. Front and Rear are denoted by the letters "F" and "R" in FIG. 10.

There are two reasons to omit the bores along the front edge. If the front wall of the drawer is only single thickness construction, the front wall is higher than the back and sides, as per FIG. 1. The shelf 111 could not be screwed to the first file drawer. Holes there could collect moisture, and food particles. Today most cabinet construction for kitchens and baths employs a lower quality material open top box configuration with a high quality front panel, often of hardwood attached thereto are the so-called double front wall construction technique drawer.

Spring clips 24 may be employed alone or in conjunction with the screws 116 to secure the device 110 to the drawer. Note that the clips are only present on the side and rear edges for attachment to the side and rear walls of the drawer. If used alone, the second embodiment becomes removable from its position on top of the drawer in question. Shelf 110 may also have an overcoat of paint or laminate, 112, as may be desired. To avoid the problem of water and debris getting into the bores 115, should a nonpermanent mounting by clips only be desired, screws 16 having an overall length less than the thickness of the shelf 111 may be employed as fillers for the bores 115.

Figure 11:
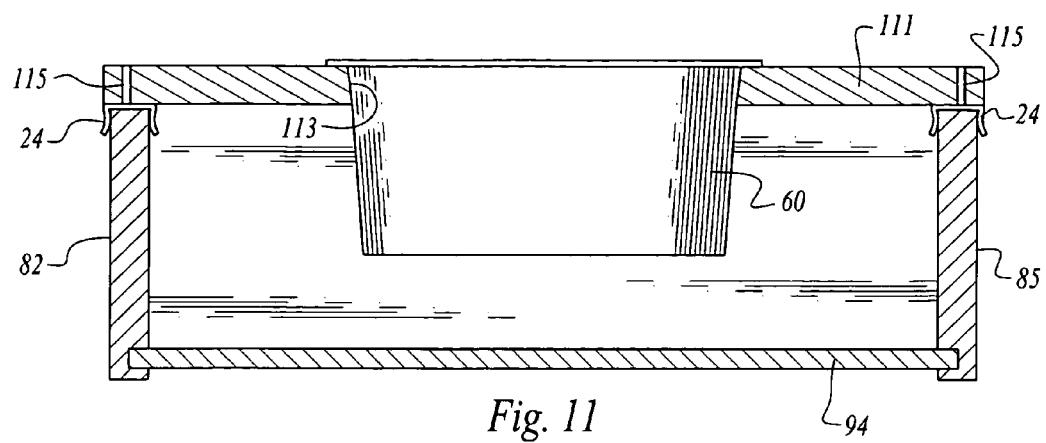
FIG. 11 is a front sectional view of the second embodiment in a mounted condition.

FIG. 11, a sectional view, shelf 111 is shown overlaying the sidewalls 82 and 85 of the drawer. Note the presence of clips 24 for shelf disposition on the sidewalls of the drawer.

Figure 12:
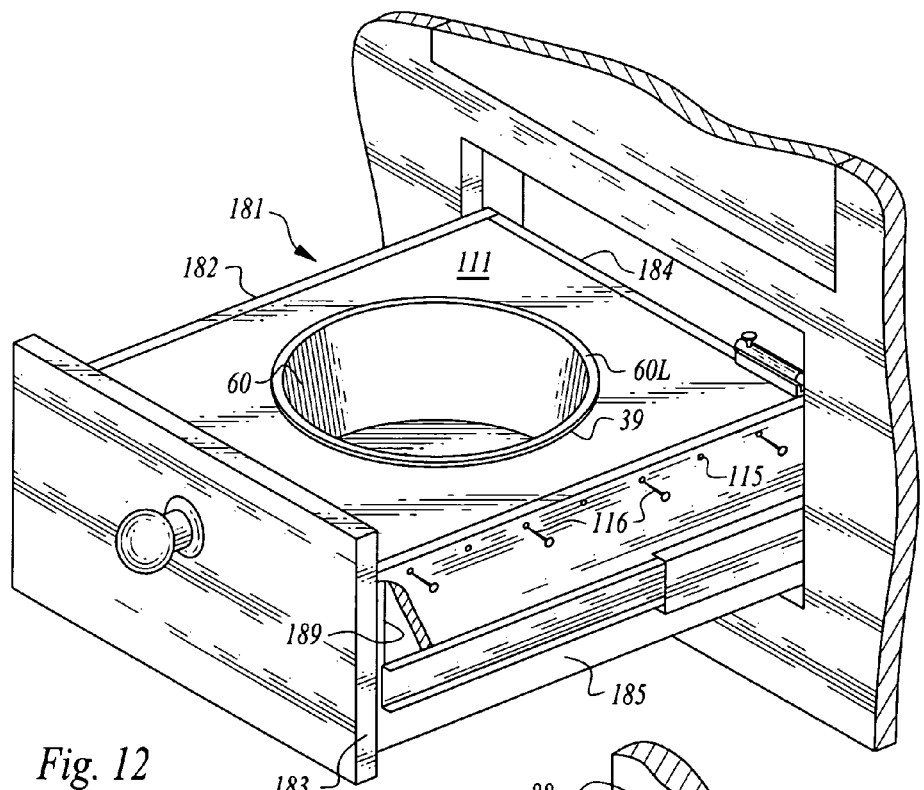
FIG. 12 is a left perspective view depicting an internal mounting of a non-expandable shelf within a drawer of the second embodiment.

In FIG. 12, the non-adjustable shelf 111 is utilized without the optional spring clips 24 and is sized to fit between the sidewalls of the drawer, rather than equal to the outside width of the drawer. Throughbores 115 are made at a suitable elevation near the top of the sidewalls 182 and 184 of drawer 181 to permit screws/nails 116 to be driven in to retain the feed bowl shelf 111 in place between the two side walls. Feed bowl 60 has a lip 60L of greater circumference than the bowl itself, such that the lip rests on the base or upon the gasket surrounding the central opening if said gasket 39 is present.

FIG. 12 is a left perspective view of a drawer 181 related to the drawer 81 of FIG. 1. The depicted drawer 181 has a hidden internal front wall 189 with the external panel 183 attached thereto as by hidden screw or adhesive, not seen in the cutaway area of the figure. The double front wall construction adds strength to the drawer's structural validity. Sidewalls 182 and 185 extend upwardly and spaced apart from each other and one connected at their front only to the internal front panel 189. Here the shelf employed is non-adjustable laterally and designated 111 due to side mounting to the drawer member. Shelf 111 is seen here to be flush and abutted to the interior surface of wall of the aforementioned sidewalls, interior front panel 189 and the rear wall 184.

Throughbores 115 are made at a suitable elevation near the tops of the sidewalls 182 & 185 and new wall 184 to permit small screws/nails 116 to be driven into the shelf 111 to retain the shelf in place.

Figure 13:
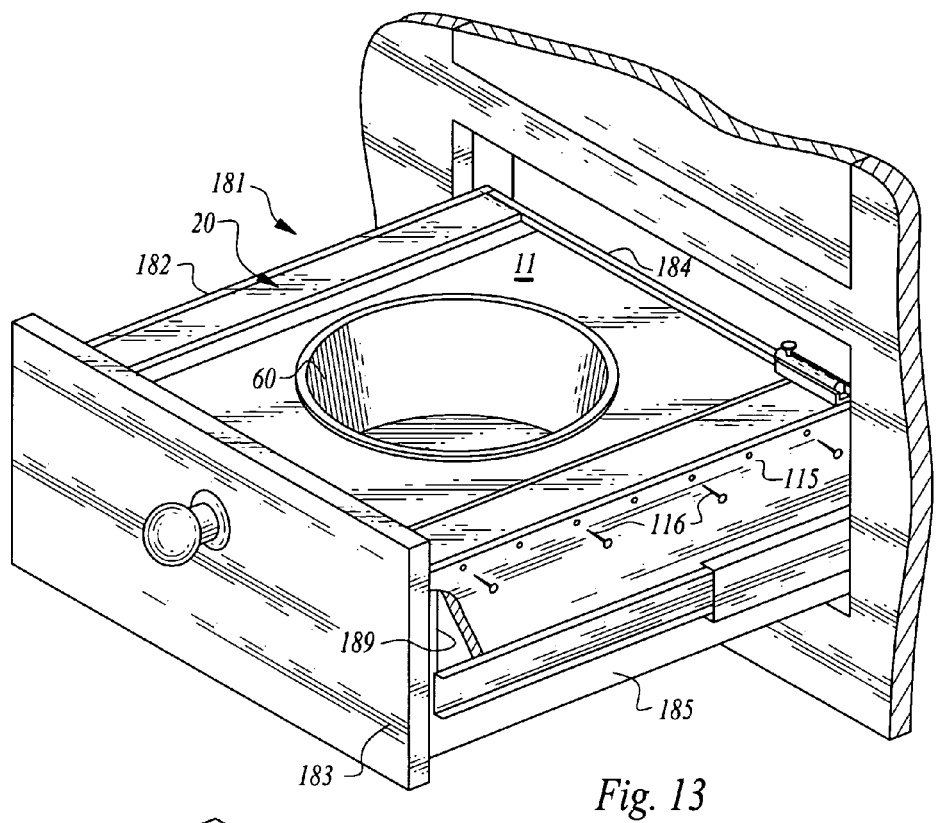
FIG. 13 is a right perspective view of the internal mounting of the first embodiment inside a drawer as opposed to on the top thereof of the first embodiment of this invention.

In FIG. 13, a variant of the mounting of the shelf mode set forth in FIG. 12 is depicted. Here in FIG. 13 the internal front wall 189 is of an elevation lower than the elevation of the side and rear walls thereof. The height of the elevation is equal to the thickness of the shelf 111. Here shelf 111 rests on top of the internal front wall 189, but is nailed as described in the previous figure, with the supper edge of the rear side walls being flush with the top surface of shelf 111.

In FIG. 13, a drawer 181 with all four walls of the same size, both mount means 20 and 120 can be adapted for mounting at the upper edge or below the upper edge of the two sidewalls 182,184 as may be desired. This is accomplished by drilling holes 115 into the sidewalls, and nailing through these carefully into the two UMSs—upper mount sections, be they 22 or 122. The figure is deemed a composite figure since one of each of the two mount means 20 and 120 is shown on the opposite sides of the composite shelf 11/111 with the artificial line 62 in between the two sections of the shelf. Such a composite figure negates the need for two figures with each depicting the adaptation for one of the two mount means.

Figure 14A:
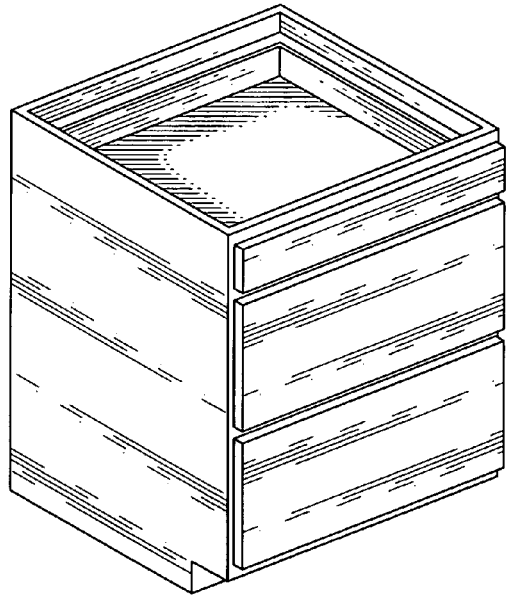
FIGS. 14A & 14B illustrate typical cabinet bases having drawers on which the feed bowl shelf of this invention can be mounted.
Figure 14B:
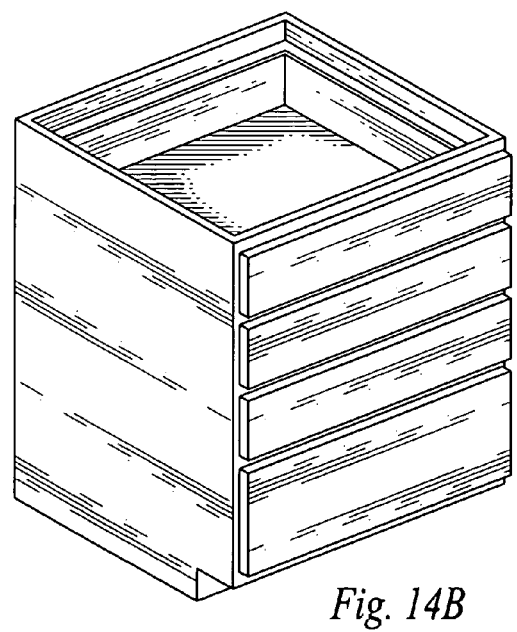

FIGS. 14A and 14B are graphical illustrations of two different types of cabinet bases as found in kitchens and baths where the feed bowl shelves of this invention can be deployed. Since these cabinets constitute prior art and form no part of this invention, further discussion of them is not needed. No effort is made to determine whether these cabinets have a single or double front wall drawer construction, as this is not relevant to the part being illustrated.

While two mount means 20 and 120 have been shown to permit the use of an adjustable shelf with the device of this invention for mounting both on the top of and within cabinet drawers of various types, it is not intended that such disclosure be limiting. Other expandable mount means may be employed as well for both top and internal mountings.

The mount means 20 and 120 that attach to the shelf aspect of this invention may be made of wood, or plastic as may be desired.

An optional gasket, 39 as seen in FIG. 10 that fits both flat and into the opening 13 for the bowl may be employed to add friction to prevent the animal from easily moving the bowl once it is placed in the opening of the shelf. It also serves to seal the bowl's edges so that food particles cannot accumulate.

It is noted that in FIGS. 14A and 14B, the drawer fronts are "face mounted". That is the front panel or wall of the drawer extends outwardly from the cabinet and amount equal to the front panel thickness. Whether this type of drawer or a "flush fitting" drawer, the invention of this application is adaptable to both styles of drawer.

Figure 15:
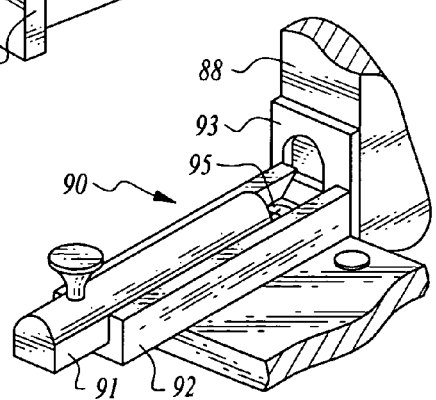
FIG. 15 is a close-up view of a portion of the invention discussed with respect to FIG. 1.

FIG. 15 as noted infra is a close-up view of the slide lock shown in FIG. 1. A brief description of the optional feed bowl shelf locking mechanism follows. Lock means 90 comprises a base 92 having a handle slider 91 that is capable of moving from a first open to a second locked position. The catch 93 is mounted on the drawer frame of the drawer 88. When the slider 91 and the catch are in alignment, movement of the slider will engage it to the catch. This keeps the drawer retained outwardly open while the animal is eating from the feeder. This conventional slider latch is available at hardware stores or home improvement centers for a nominal cost.

Figure 16:
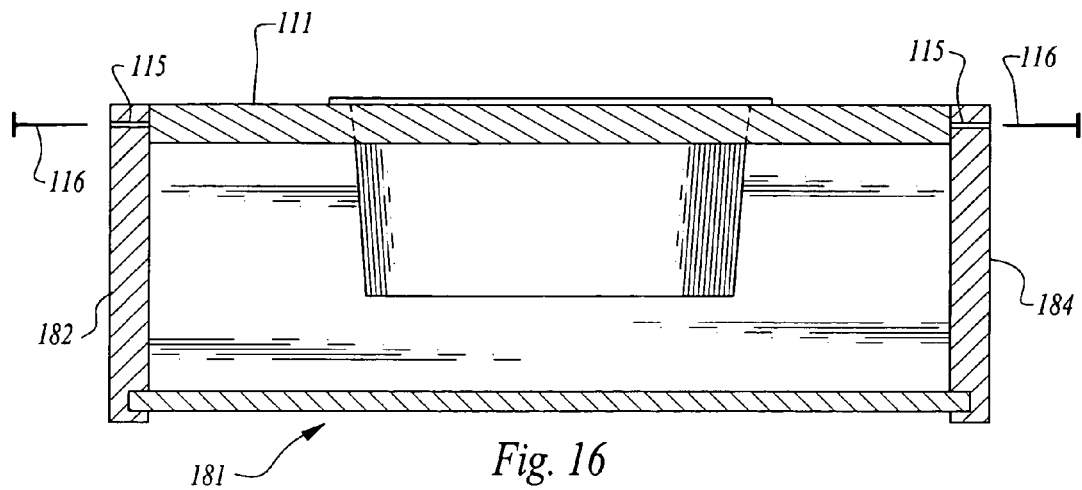
FIG. 16 is a graphical right side elevational view of a variant of the mounting of the non-expandable shelf shown in FIG. 12.
Figure 17:
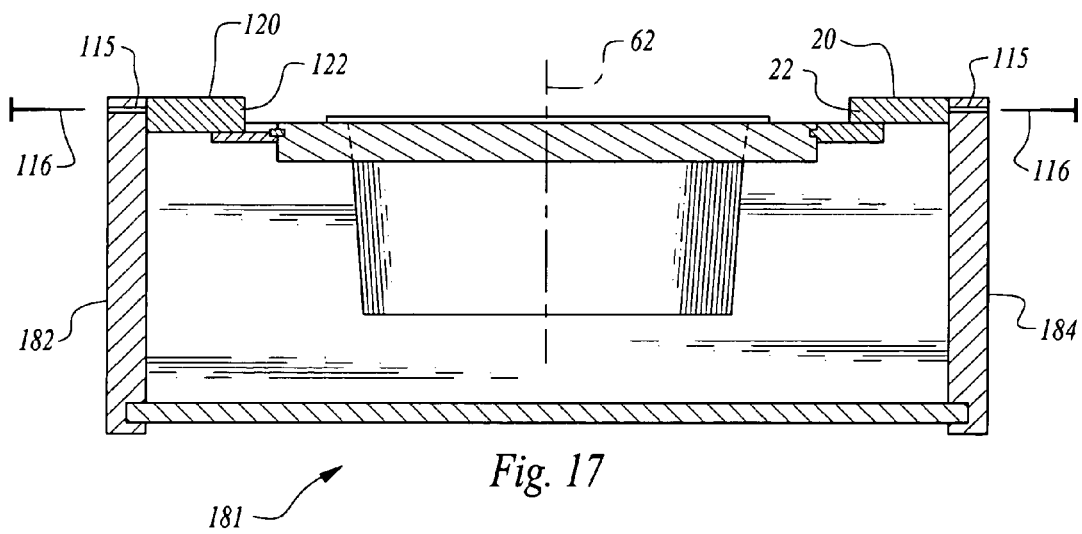
FIG. 17 illustrates a variant to the mount means discussed with respect to FIG. 5.

In FIG. 13 there is illustrated a drawer having a front panel that is either an outside panel or the only panel of the front of the drawer. This front panel is of a greater elevation than the side and rear walls of the drawer seen there. Some cabinet drawers have all four walls, including the front wall, of equal height, in that situation, mounting the shelf 11 or 111 to the top edges of the drawer sidewalls would not work, as the total height would be greater than the drawer opening. Therefore, an alternate mount mode to permit usage of shelf 11 and shelf 111 with such drawers is needed. Reference is thus made to FIGS. 16 and 17.

FIG. 15 is a close-up view of the lock mechanism 90 that serves as a retention means that can be employed to keep the drawer with an inventive device of this application, be it embodiment 1 or 2 in a fixed open position.

The slide lock 90 illustrated is mounted to the shelf by a pair of recessed mounting screws 95 that are treaded through bores or a slot (not visible here) in the base 92 beneath the slider 91 of the latch means 90. The catch 93 is conventionally attached to the drawer frame 88 by screws. Other styles of slide locks such as the style employing a handled cylindrical bolt may also be employed for this purpose.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A cabinet drawer and a mountable removable feed bowl shelf non-permanently mounted to the drawer to hold an animal's feed or water bowl, which feed bowl shelf comprises: a quadrilateral base having four right angles, and having front and rear edges and spaced left and right side edges, said base also having a central opening therein through which said feed or water bowl is received; further including a plurality of spring clips disposed on the underside of said feed bowl shelf engaging the thickness of the side walls of the drawer to which the feed bowl shelf is to be attached, whereby the drawer serves double duty as a locus for the mounting of the shelf when animal feeding/watering is desired, and the drawer can also serve as a storage location.

2. The cabinet drawer and shelf of claim 1 further including a linear series of vertical spaced un-filled nail holes along the left and right side edges of the feed bowl shelf, for the receipt of pins to engage said drawer sides to aid in the alignment of the shelf with the drawer to which it is to be removably mounted.

3. A cabinet drawer situated within a cabinet and a feed bowl shelf non-permanently mounted to the drawer to hold an animal's feed or water bowl, which feed bowl shelf comprises: a quadrilateral base having four right angles, and having front and rear edges and spaced left and right side edges, said base also having a central opening therein through which said feed or water bowl is received; further including a linear series of vertical spaced un-filled nail holes along the left and right side edges of the feed bowl shelf for the receipt of pins to engage said drawer sides to aid in the alignment of the shelf with the drawer to which it is to be removably mounted whereby the drawer can serve double duty as a locus for the mounting of the shelf when animal feeding/watering is desired, and the drawer can also serve as a storage location.

4. A cabinet drawer having spaced side walls, and spaced front and rear walls normal to said side walls, and a bottom wall and being situated within a cabinet;

said side walls, and said front and rear walls having shelf support means distant from said bottom wall, to support a shelf in a generally horizontal disposition, said shelf support means having a series of upstanding spaced pins therein;

said drawer having a non-permanently mountable removable feed bowl shelf holding an animal's feed or water bowl, removably mounted thereto;

which feed bowl shelf comprises: a quadrilateral base having four right angles, and having front and rear edges and spaced left and right side edges, said base also having a central opening therein through which said feed or water bowl is received;

said base further including a linear series of vertical spaced un-filled nail holes along the two edges of the feed bowl shelf for the receipt of said pins of said shelf support means, said holes being aligned with said pins, whereby said pins engage said shelf to aid in the alignment of the shelf with the drawer to which it is to be removably mounted.

5. The cabinet drawer of claim 4 further including a gasket disposed around said central opening upon which said feed or water bowl rests.

6. The cabinet drawer of claim 4 wherein the nail holes are on the left and right side edges of said shelf, such that the drawer can serve double duty as a locus for the mounting of the shelf when animal feeding/watering is desired, and the drawer can also serve as a storage location.

7. A cabinet drawer having spaced side walls, and spaced front and rear walls normal to said side walls, and a bottom wall;

said side walls, and said front and rear walls having shelf support means distant from said bottom wall, to support a shelf in a generally horizontal disposition, said drawer having a non-permanently mountable removable feed bowl shelf to hold an animal's feed or water bowl, removably mounted thereto;

which feed bowl shelf comprises: a quadrilateral base having four right angles, and having front and rear edges and spaced left and right side edges, said base also having a central opening therein in which the feed or water bowl is received;

said shelf further including a plurality of spring clips disposed on the underside of said feed bowl shelf disposed in spaced alignment with the side walls of said drawer, and engaging the thickness of the side walls of the drawer to which the feed bowl shelf is removably attached.

8. The cabinet drawer of claim 7 further including a gasket disposed around said central opening upon which the feed bowl rests.

9. A cabinet drawer having spaced side walls, and spaced front and rear walls normal to said side walls, and a bottom wall and being situated within a cabinet;

said side walls, and said front and rear walls having shelf support means distant from said bottom wall, to support a shelf in a generally horizontal disposition, said shelf support means having a series of spaced pin bores therein;

said drawer having a non-permanently mountable removable feed bowl shelf holding an animal's feed or water bowl, removably mounted thereto;

which feed bowl shelf comprises: a quadrilateral base having four right angles, and having front and rear edges and spaced left and right side edges, said base also having a central opening therein through which said feed or water bowl is received;

said base further including a linear series of vertical spaced un-filled nail holes along two edges of the feed bowl shelf for the receipt of pins, said holes being aligned with said bores, and pins disposed in said holes and engaging said bores whereby said shelf is removably mounted to said drawer.

* * * * *